United States Patent
Goloshchapova

(10) Patent No.: US 10,655,408 B2
(45) Date of Patent: May 19, 2020

(54) MOBILE PROPPANT RECOGNITION

(71) Applicant: SCHLUMBERGER TECHNOLOGY CORPORATION, Sugar Land, TX (US)

(72) Inventor: Dina Goloshchapova, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 1 day.

(21) Appl. No.: 15/737,514

(22) PCT Filed: Jun. 23, 2015

(86) PCT No.: PCT/US2015/037065
§ 371 (c)(1),
(2) Date: Dec. 18, 2017

(87) PCT Pub. No.: WO2016/209208
PCT Pub. Date: Dec. 29, 2016

(65) Prior Publication Data
US 2018/0112478 A1    Apr. 26, 2018

(51) Int. Cl.
*E21B 21/06* (2006.01)
*G01N 15/14* (2006.01)

(52) U.S. Cl.
CPC ....... *E21B 21/066* (2013.01); *G01N 15/1463* (2013.01); *G01N 2015/1486* (2013.01); *G01N 2015/1493* (2013.01); *G01N 2015/1497* (2013.01)

(58) Field of Classification Search
CPC .................. G01N 15/1463; E21B 21/066
See application file for complete search history.

(56) References Cited

U.S. PATENT DOCUMENTS

| | | | |
|---|---|---|---|
| 5,721,433 A * | 2/1998 | Kosaka | G01N 15/0227 250/573 |
| 6,330,916 B1 | 12/2001 | Rickards et al. | |
| 6,776,235 B1 | 8/2004 | England | |
| 8,839,865 B2 | 9/2014 | Willberg et al. | |
| 2005/0274523 A1 | 12/2005 | Brannon et al. | |
| 2006/0048943 A1 | 3/2006 | Parker et al. | |
| 2009/0159287 A1 | 6/2009 | Tu et al. | |
| 2012/0257039 A1 * | 10/2012 | Abe | G06T 7/187 348/79 |

(Continued)

FOREIGN PATENT DOCUMENTS

| EP | 0660103 A2 | 6/1995 |
|---|---|---|
| RU | 127935 | 5/2013 |

(Continued)

OTHER PUBLICATIONS

International Search Report issued in International Patent Appl. No. PCT/US2015/031065 dated Jun. 23, 2015; 20 pages.

(Continued)

*Primary Examiner* — Edward Park

(57) ABSTRACT

A method for analyzing particles that may include collecting an image of a substrate including a size tracer and a plurality of particles thereon; processing the collected image; and outputting a particle analysis of at least a portion of the plurality of particles. In some instances the particles analyzed may be particles involved in wellbore operations.

12 Claims, 7 Drawing Sheets

(56) References Cited

U.S. PATENT DOCUMENTS

| | | | | |
|---|---|---|---|---|
| 2012/0308613 A1* | 12/2012 | Staniforth | ............ | A61K 9/0075 |
| | | | | 424/400 |
| 2013/0176048 A1* | 7/2013 | Furukubo | ............. | C04B 35/185 |
| | | | | 324/756.03 |
| 2014/0123739 A1 | 5/2014 | Luo | | |
| 2014/0333754 A1 | 11/2014 | Graves et al. | | |
| 2014/0372085 A1* | 12/2014 | Korten | ............... | A61C 13/0004 |
| | | | | 703/1 |

FOREIGN PATENT DOCUMENTS

| | | |
|---|---|---|
| RU | 2531261 | 9/2013 |
| WO | WO2012174065 | 12/2012 |

OTHER PUBLICATIONS

Office Action dated Feb. 6, 2019 in corresponding RU application No. 2017142897/03 (073993) with English translation; 15 pages.

\* cited by examiner

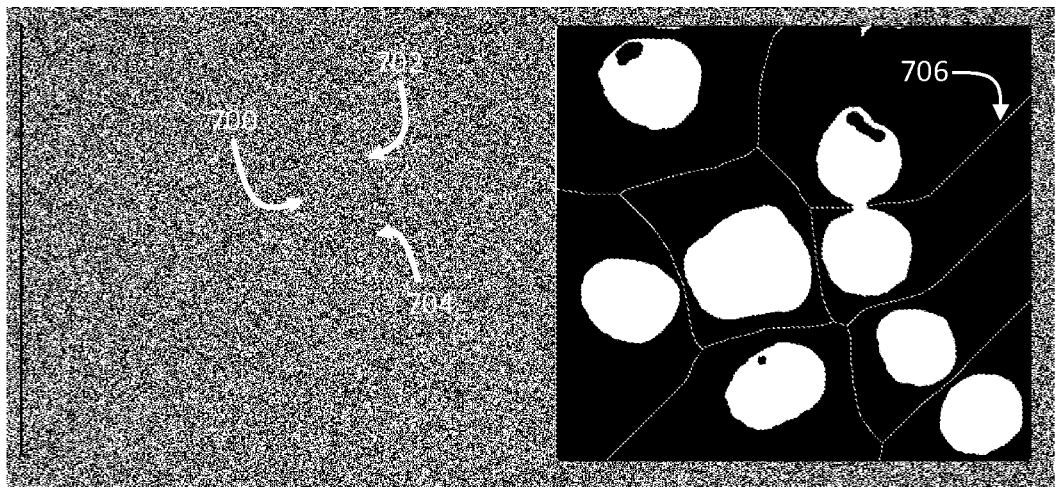
FIG. 7-1     FIG. 7-2
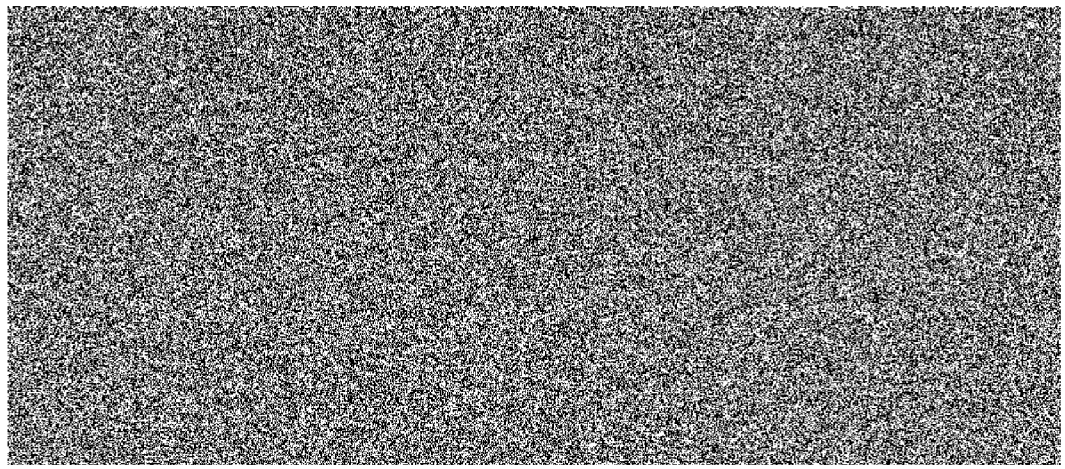
FIG. 8-1     FIG. 8-2

MOBILE PROPPANT RECOGNITION

BACKGROUND

In many instances, when using particles in an application it is useful to understand the properties of the particles in order to maximize the possibility of their success in the application. Broadly, properties such as the chemical and physical composition of the particles may be taken into consideration to achieve the intended result. For example, in a fracturing operation the chemical and/or physical composition of the particles that would be ideal for use may depend greatly on the geological properties of the subterranean formation and the particular effect to be achieved at that phase of the operation.

Thus, many types of particles may be available for a specific operation and the ability to identify the properties of those particles that are on hand or delivered to oftentimes remote locations is imperative for an operation to be completed in a timely and efficient manner. However, much of the particle size analysis that is done in the field is sieve-based analysis that is time consuming and inappropriate to accurately characterize the dimensions of particles that deviate substantially from perfect spheres. Specialized equipment designed to perform automatic physical characterization of particles exists, and is precise and robust compared to sieve-based analysis, but the price and large size of the equipment does not allow for its application at remote field sites.

SUMMARY

In one aspect, embodiments disclosed herein relate to a method for analyzing particles that includes collecting an image of a substrate including a size tracer and a plurality of particles thereon; processing the collected image; and outputting a particle analysis of at least a portion of the plurality of particles.

In another aspect, embodiments disclosed herein relate to a method for analyzing particles involved in wellbore operations that includes collecting a plurality of particles to be or that have been used in a wellbore operation; collecting an image of a substrate including a size tracer and a plurality of the particles thereon; processing the collected image; and outputting a particle analysis of at least a portion of the plurality of particles.

In yet another aspect, embodiments disclosed herein relate to a non-transitory computer readable medium (CRM) storing instructions for operating a mobile device that includes a screen, the instructions comprising functionality for: normalizing an image of a plurality of particles on a substrate with respect to a size tracer; filtering the image; performing particle edge determination on the image; performing marker-controlled watershed segmentation; performing particle separation; performing particle filling; performing particle characterization; and displaying, on the screen of the mobile device, the results of the particle characterization.

Other aspects and advantages of the disclosure will be apparent from the following description and the appended claims.

BRIEF DESCRIPTION OF DRAWINGS

FIG. 5-1 depicts a before picture of a collected image subjected to filtration.

FIG. 5-2 depicts an after picture of a collected image subjected to filtration.

FIG. 6-1 depicts a before picture of a collected image subjected to edge determination.

FIG. 6-2 depicts an after picture of a collected image subjected to edge determination.

FIGS. 7-1 and 7-2 depict a collected image that has been subjected to Marker-Controlled Watershed segmentation.

FIG. 8-1 depicts a before picture of a collected image showing particles that have been separated and filled.

FIG. 8-2 depicts an after picture of a collected image showing particles that have been separated and filled.

FIG. 9-1 shows the screen of the smartphone showing the saved images as ordered by the date and time of their acquisition.

FIG. 9-2 shows the screen of the smartphone upon the selection of one of the images listed in FIG. 9-1.

FIG. 9-3 shows the screen of the smartphone upon completion of the image processing and analysis.

DETAILED DESCRIPTION

Embodiments disclosed herein relate generally to image analysis methods. For example, embodiments disclosed herein may be directed towards the analysis of optical images for determining the characteristics of a group of particles. More particularly, embodiments disclose herein relate to methods, unencumbered by costly and bulky specialized equipment, for analyzing the physical characteristics of particles.

Figure 1:
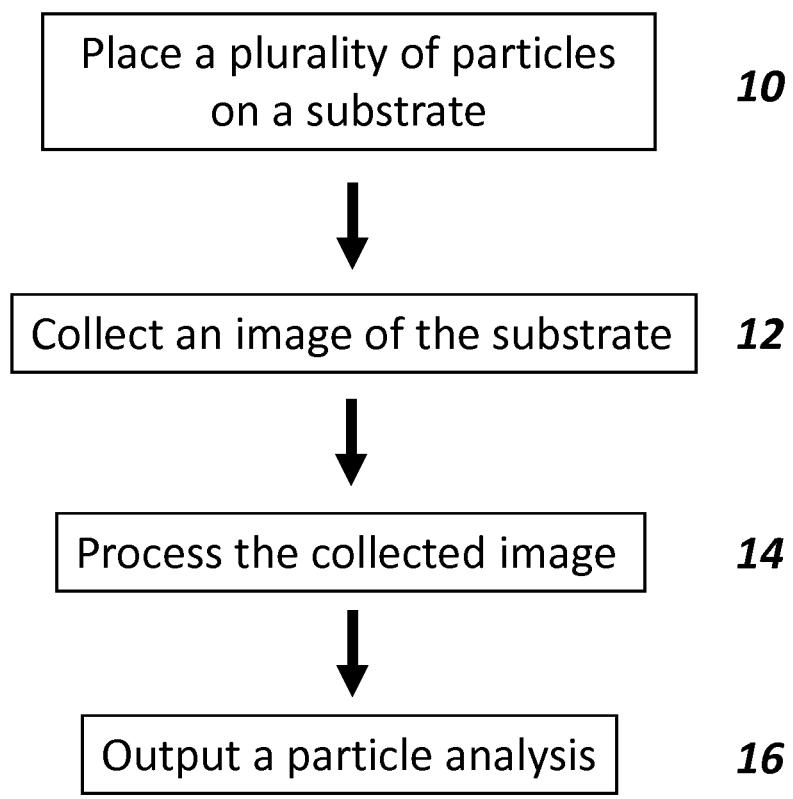
FIG. 1 shows a generalized flow chart for a method of analyzing particles.

A generalized flow chart for a method of analyzing particles as disclosed herein is shown in FIG. 1. In the generalized method, a plurality of particles are placed on a substrate 10, an image of the substrate is collected 12, the collected image is processed 14, and a particle analysis is output 16. Each of these aspects of the method will be discussed below in further detail.

In some embodiments, a method for analyzing particles may include an operator placing a plurality of particles to be analyzed on a substrate. In one or more embodiments, it may be beneficial for the plurality of particles to form a single monolayer upon their placement upon the substrate. The use of a single monolayer on the substrate may serve to reduce potential error induced in the analysis by the stacking or overlapping of particles. While there are no restrictions on the amount of particles needed to perform the analysis using methods described herein, it will be appreciated that the higher the amount of particles included in the analysis, the greater the statistical significance of the analysis produced. Thus, in some embodiments at least 25 particles, or at least 50 particles, or at least 100 particles may be placed upon the substrate for analysis.

Generally, the particles that may be analyzed by methods disclosed herein may be synthetic or naturally produced. In some embodiments, the particles capable of being analyzed may include fracturing proppants, sands, gravel material, crushed rock, completion materials, drill cuttings, lost circulation materials, or other types of materials involved in wellbore operations. In some embodiments, the particles are collected and analyzed prior to their use in a wellbore operation, while in other embodiments the particles may be collected and analyzed after their use in a wellbore operation. In embodiments where the particles being analyzed are particles that have been returned from the wellbore, it may be useful to wash/or clean the particles prior to their analysis. Further, if the particles are wet it may be useful for them to be dried prior to analysis to reduce errors that may arise.

The particles that can be analyzed by the method disclosed herein may be a variety of shapes or sizes, including particles with dimensions ranging generally from 0.1 to 40 mm. In some embodiments particles that are substantially spherical and round having a diameter between about 0.1 mm to about 4 mm, or more specifically between about 0.1 and 2 mm, may work particularly well for the analysis. However, there is not a restriction on the lower range of the particle size, just the inherent limitations placed on the analysis by the resolution possible with the camera of the image collecting device. Further, there is no limit on the upper range of particle size that may be measured as long as the particles are smaller than the size tracer. In other embodiments, the method disclosed herein may be used to analyze rod-shaped particles having an average aspect ratio (the ratio between the length and the diameter of the rod-shaped particles) greater than about 2, or greater than about 5, or greater than about 10. In some embodiments, the methods disclosed herein may be used to analyze particles with a maximum aspect ratio of about 25. The rod-shaped particles that may be analyzed may have a length between about 0.1 mm to about 4 mm, or more specifically between about 0.1 and 2 mm. In some embodiments, the rod-shaped particles may have a diameter between about 0.1 mm to about 2 mm, or more particularly between about 0.1 mm and 1 mm.

In one or more embodiments, the substrate may be formed from any material and in any shape as long as it possesses a substantially flat surface where the particles may be placed for analysis. In some embodiments, the substrate may be constructed so that it may be reused for the analysis of multiple batches of particles. For example, the substrate may be fabricated out of a plastic or metal material, making it robust and capable of adequately maintaining its dimensions over many uses. In other embodiments, the substrate may be constructed so that it may be essentially single use and capable of being easily disposed of after an analysis is complete. For example, the substrate may be a sheet of paper or other equivalent material lacking the sturdiness to adequately maintain its dimensions over many uses. In some embodiments, a notebook having a plurality of suitable substrates may be fabricated so that an adequate supply of substrates are available for the particle analysis. In other embodiments, standard business cards may be used as a substrate, with the commonly blank back side of the cards possessing the size tracer, as discussed below. In one or more embodiments, the substrate may be a particular color, with the color of a substrate chosen depending upon the coloring of the particles for analysis. For example, substantially white (or lighter colored) particles will exhibit more contrast in a collected image when they are placed upon a substrate that is a darker color than the particles (e.g., a black or similarly dark substrate). Conversely, substantially black (or darker colored) particles will exhibit more contrast in a collected image when they are placed upon a substrate that is a lighter color than the particles (e.g., a white or similarly light substrate). In one or more embodiments, substrates that are a shade of red or green may be used as a universal substrate for the analysis of particles that are dark or light, since both types of particles may exhibit adequate contrast when placed thereon.

Regardless of the exact composition of the substrate, the substrate includes a size tracer, which is used as a reference to orient and analyze the image during the analysis of the particles on the substrate. In some embodiments, the size tracer may be printed or otherwise applied upon the substrate so that it is affixed thereto. In some embodiments, it may be beneficial for the coloring of the size tracer to be correlated with the color of the substrate so that they exhibit a more pronounced contrast difference with respect to each other. For example, when the substrate is a darker color the size tracer may be a lighter color, and vice-versa.

In one or more embodiments, the size tracer may include at least one of at least two lines or at least three geometric shapes. In some embodiments, the geometric shapes may be selected from circles, ellipses, simple polygons, such as squares, rectangles, parallelograms etc. where the boundaries of the polygons do not self-intersect, or star polygons, where the boundary may be allowed to self-intersect. In some embodiments, the at least two lines of a size tracer may be parallel to each other. For example, the outer boundary of the magnetic strip on a credit card may be equated as the two parallel lines defining a size tracer if using a credit card as a substrate. In some embodiments, at least one dimension selected from the length of the lines, a dimension of the geometric shapes (i.e, edge length, radius, diameter, etc.), or a distance between the lines and/or geometric shapes is a known dimension. Further, the size tracer may possess at least one dimension that is substantially larger than the particles that are being analyzed. For example, when the size tracer has at least one dimension that is substantially larger than the particles being analyzed it may reduce possible error in the analysis due to confusion between the particles and the size tracer. In some embodiments, the size tracer may possess at least one dimension (e.g., length of a line or edge length, radius, diameter, etc. of the geometric shapes) that is at least twice as large as a dimension of the particles being analyzed.

Figure 2:
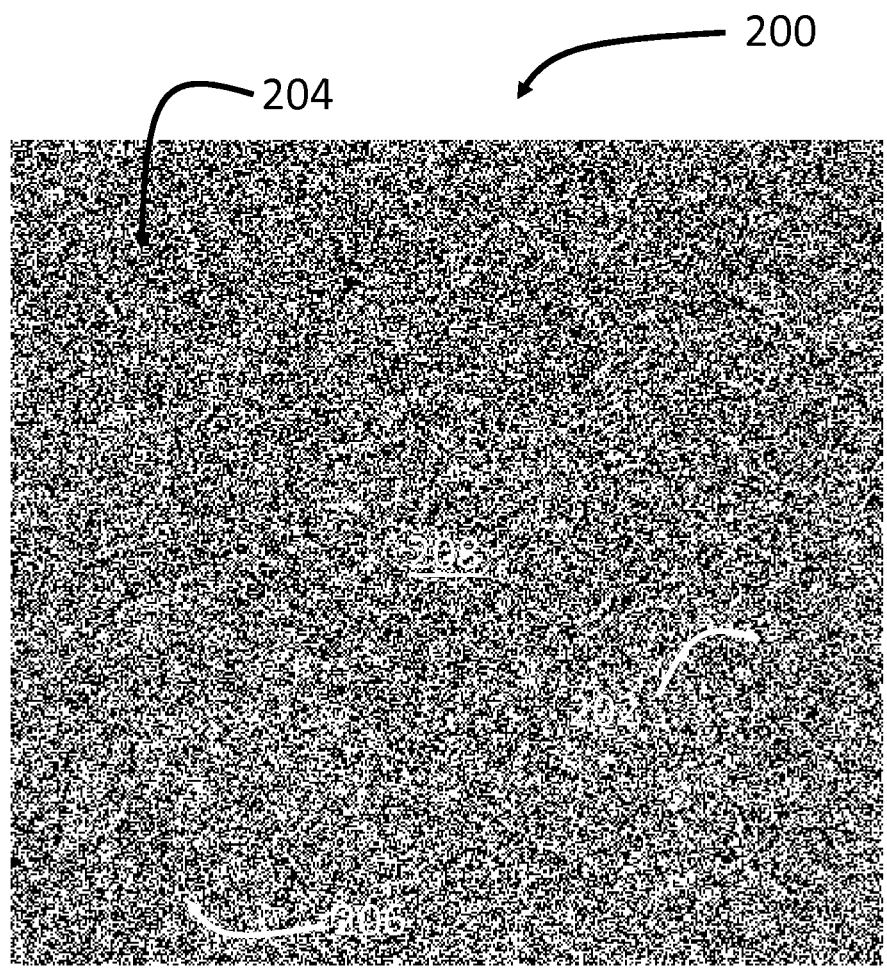
FIG. 2 depicts a substrate with a size tracer according to an embodiment of this disclosure.

For example, FIG. 2 depicts a substrate 200 in accordance with embodiments of this disclosure. The substrate has a measuring area 208, four lines 202 of equal length, and two sets of four geometric shapes counting the solid white squares 204 inscribed within the hollowed white squares 206. In this example, the four lines 202 of equal length and the two sets of four geometric shapes may be collectively taken to be the size tracer of the substrate 200. In some embodiments, simply two (or more) of the lines and three (or more) of the geometric shapes may be taken to be the size tracer of the substrate. In some embodiments, at least one of the length of lines 202, the edge length of the squares 204 and 206, the inner edge length of the hollow square, the distance between parallel lines 202 or between the geometric shapes may be a known dimension.

Due to the predominantly dark measuring area 208 of the substrate 200 in FIG. 2, substrate 200 may be particularly useful in analyzing particles that may be lighter in color. Conversely, if darker particles were to be analyzed it may be beneficial to invert the colors of the substrate 200 in FIG. 2 in order to achieve a contrast between particles and the measuring area 208. For example, to measure darker particles, the areas that are black in FIG. 2 may be colored white or another lighter color, while the areas that are white (the size tracers) may be colored black or another darker color.

In one or more embodiments, an image of the substrate including a size tracer and a plurality of particles thereon may be collected. In some embodiments, the collected image may include the entirety of the substrate and the size tracer, while in other embodiments the collected image may merely include a portion of the substrate and the size tracer. Specifically, in some embodiments, an analysis of the particles on the substrate may be performed if the collected image includes at least one of the at least two lines or at least three geometric shapes of the size tracer.

Figure 3:
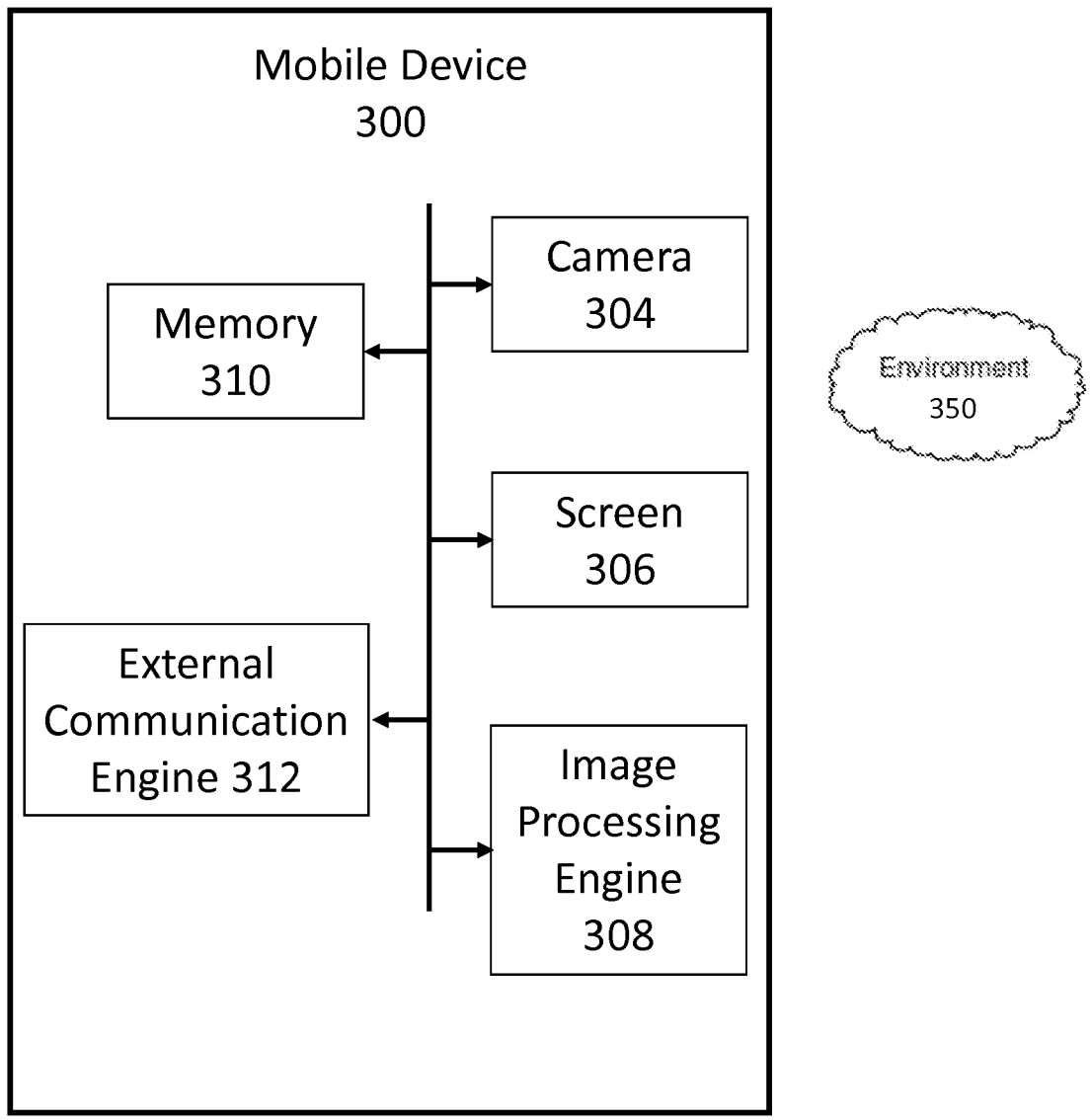
FIG. 3 depicts a mobile device according to some embodiments of this disclosure.

In some embodiments, the image may be collected by a mobile device which has a camera. For example, the mobile device may be a mobile computer device (e.g., a smart phone, tablet PC, laptop, e-reader, etc.) and/or a wearable computer device (e.g., a pair of glasses, a watch, etc.). FIG. 3 shows a mobile device 300 in accordance with one or more embodiments of this disclosure. As shown in FIG. 3, the mobile device may have multiple components including, for example, a rendering engine 302, a camera 304, a screen 306, and an image processing engine 308. Each of these components will be discussed in more detail below.

In one or more embodiments, the mobile device 300 includes a screen 306. The screen 306 may be of any resolution and capable of displaying text, graphics, images, videos, animation, etc. in any color. In embodiments where the mobile device 300 is a pair of glasses, the screen 306 may be located within a lens or spread across both lenses of the pair of glasses.

In one or more embodiments, the mobile device 300 includes a camera 304. The camera 304 may be configured to collect images of the environment 350 behind or in front of the screen 306. For example, the environment 350 behind or in front of the screen may include a substrate including a size tracer and a plurality of particles thereon. In some embodiments, it may be beneficial to hold the mobile device 300 a specific distance away from the object that is subject of the image to be collected by the camera 304. Additionally, in some embodiments, it may be beneficial to align the mobile device 300 so that the subject of the image to be collected by the camera 304 is parallel to the face of the camera 304; however, if the subject of the image is not parallel with camera 304, image processing may be used to account for this misalignment, as discussed in greater detail below. In embodiments where the mobile device 300 is a pair of glasses, the camera 304 may be attached to the pair of glasses. For example, the camera 304 may be located within the frame of the pair of glasses or mounted on the frame. In other embodiments, the camera 304 may be mounted on an edge of the screen 306 or located within the screen 306. In some embodiments, multiple images may be collected by the camera 304 and stored within the memory 310 of the mobile device 300 for later processing and analysis. In this way, the clearest image that is collected by the camera 304 may be chosen for analysis or multiple images of the same, or different, samples may be analyzed and compared at a later time.

Figure 4:
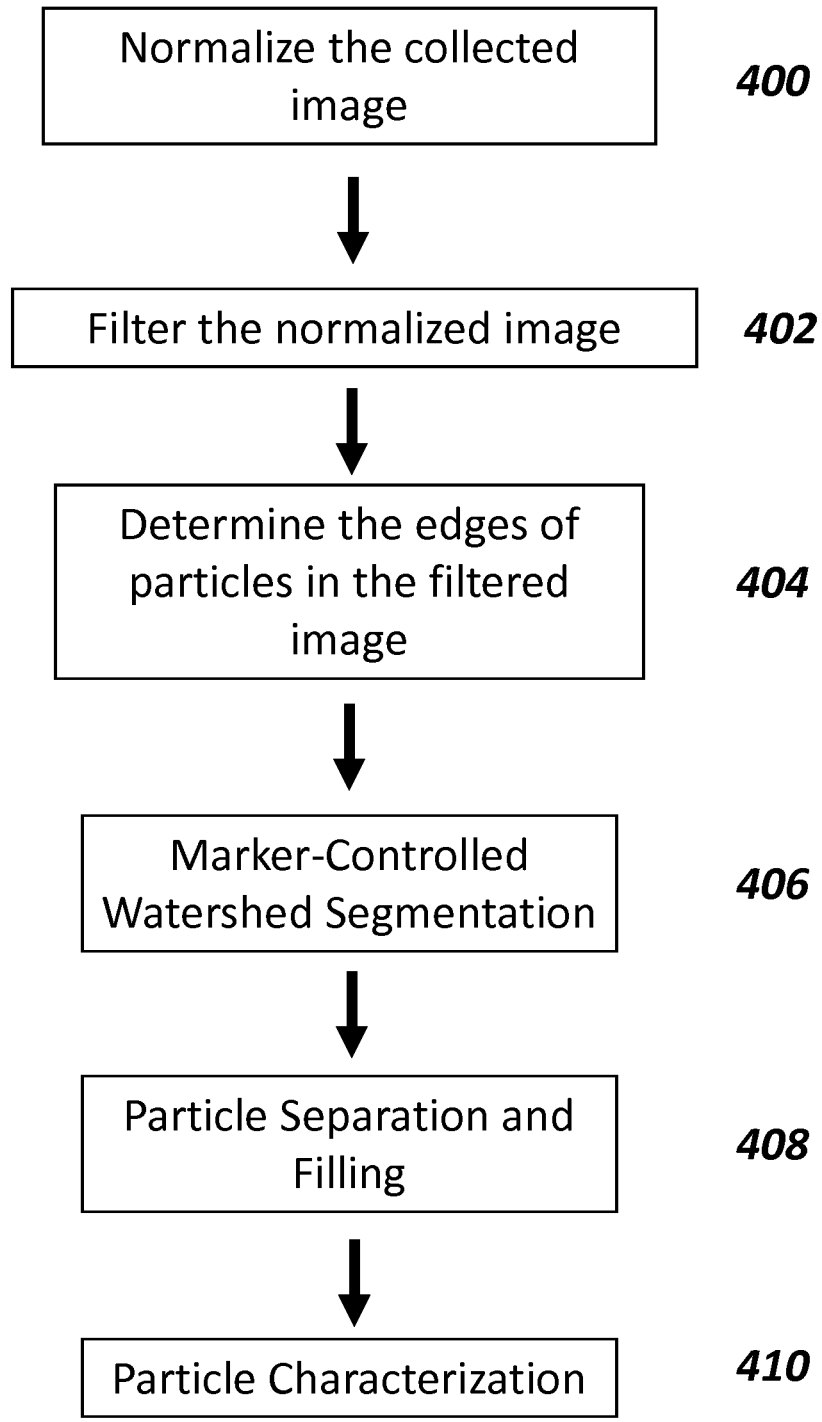
FIG. 4 depicts a potential sequence for processing a collected image.

Once an image of a plurality of particles on a substrate is collected (and potentially stored in memory 310) by a mobile device 300 it may be processed by the image processing engine 308 of the mobile device 300. During the image processing at least one of normalizing the image with respect to the size tracer, filtering, particle edge determination, marker-controlled watershed segmentation, particle separation, particle filling, and particle characterization may occur. FIG. 4 depicts a potential sequence for processing a collected image. Other processing sequences, removing and/or re-ordering the stages shown in FIG. 4, may also be used to process a collected image. Further, while FIG. 4 depicts a potential sequence for processing a single collected image, this disclosure is also intended to encompass embodiments where a plurality of images of the same lot or sample of particles may be collected and processed similarly, with the result that is output being an averaged or cumulative result over all (or a selected subset) of the analyzed images.

Normalizing the collected image 400 with respect to the size tracer may be performed to compensate for any divergence from the camera 304 being parallel to the substrate that existed during the collection of the image. As may be appreciated, using a mobile device in the field to collect an image may result in a less than perfectly aligned image. This misalignment may lead to errors during the particle analysis and therefore, the image processing engine 308 may correct the imperfect collected image by normalizing it with respect to the known dimensions and orientations of the size tracer located on the substrate. For example, by correcting an imperfect image to exhibit a known dimension between two parallel lines or a known edge length of a geometric shape, among other possibilities, the image processing engine 308 may be able to normalize the image for a less error prone analysis.

Figures 1, 5:
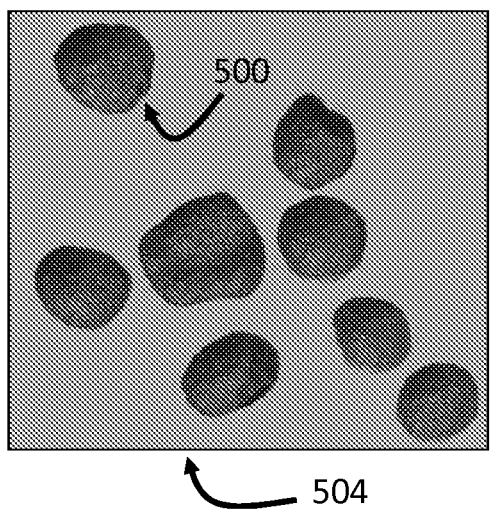
Figures 2, 5:
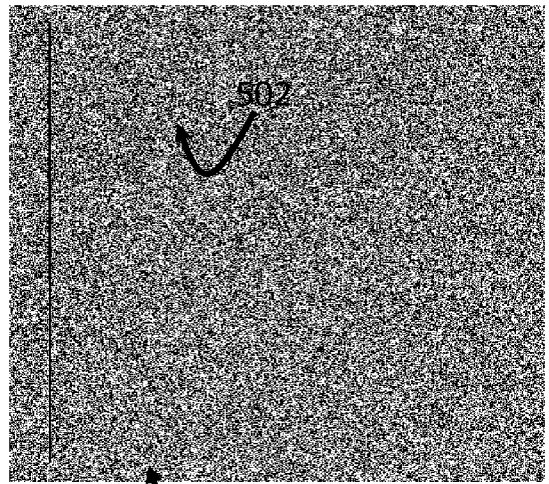

In some embodiments, after normalization 400, the image may be filtered 402 to provide for the maximum contrast between the area occupied by the particles and that of the substrate. FIGS. 5-1 and 5-2, respectively depict a before and after picture of an image subjected to filtration 402. As can be seen, a much higher degree of contrast with a substrate 504 is seen for a particle after filtration 502 in comparison to a particle before filtration 500.

Figures 1, 6:
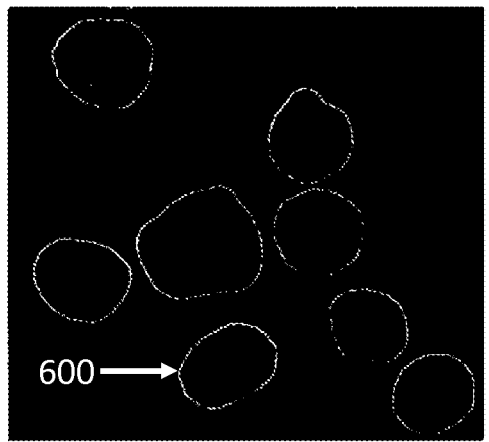
Figures 2, 6:
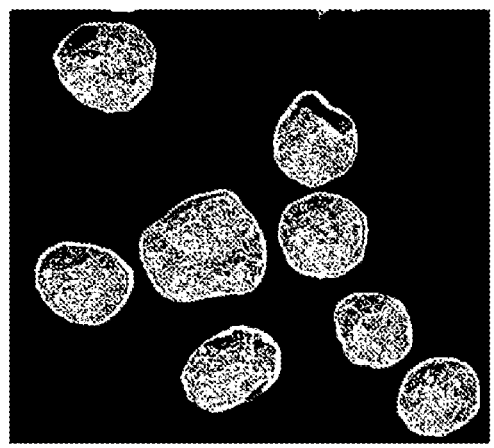

Another aspect of image processing may include the edge determination of the particles 404. During edge determination 404 the boundaries of the areas covered by the particles may be determined so that their dimensions (and other characteristics) may be determined. In some embodiments, a prior filtration 402 of the image may assist with edge determination 404 if there is not enough contrast between the particles and substrate to determine the edge of the particles. FIG. 6-1 depicts a lighter line illustrating the area of highest contrast between the particles and the substrate, with one example shown as 600 in FIG. 6-1. This lighter line is the determined edge of the particles. FIG. 6-2 depicts the particle area filling that occurs after the area of highest contrast between the particles and the substrate is determined.

Another aspect of the image processing may include a Marker-Controlled Watershed segmentation 406. This aspect may serve to indicate/separate particles that are touching (or appear to be touching) in the image so that a particle analysis either divides the touching particles into discrete particles or rejects the touching particles so that the analysis does not consider the agglomerate as a single particle. By accounting for these agglomerates with one of the two strategies mentioned above, the error in the particle analysis may be reduced. In some instances the agglomerates identified by the Marker-Controlled Watershed segmentation 406 may be completely ignored during a subsequent particle analysis, while in other embodiments the image processing engine 308 may separate them into discrete particles for the particle analysis. FIGS. 7-1 and 7-2 depict a collected image that has been subjected to Marker-Controlled Watershed segmentation 406. As can be seen by the neck 700 connecting the two particles 702 and 704 in FIG. 7-1, the Marker-Controlled Watershed segmentation has identified two closely spaced particles that may have been counted as a single particle during a particle analysis. FIG. 7-2 shows the particles are separated into their own segments as outlined by the thin white lines (of which 706 is an example) in the Marker-Controlled Watershed segmentation. Thus, particles 702 and 704 of FIG. 7-1 have been separated and will be counted as separate particles in the analysis.

Another aspect of the image processing may include particle separation and filling 408. During this stage the particles that have been identified to be touching (or appear to be touching) may be separated so that they are counted individually in a subsequent particle analysis. Additionally, the particles may be filled to indicate the area enclosed by the edges of the particles. Further, in some embodiments, the contrast, color, and/or design of the fill may be used to visually indicate if any particles may be excluded or otherwise differentiated from the other particles during the analysis. For example, in some embodiments it may be desirable to exclude particles that are substantially elongated or rod/like from a particle analysis so that the substantially rounded particles may be analyzed separately, and vice/versa. In some embodiments, image artifacts may be capable of being identified and excluded from any particle analysis that is performed on a processed image. In these instances, having a visual indication of which particles are currently being included and which are excluded from the analysis may help to inform an operator of the validity or scope of the analysis.

In one or more embodiments, the contrast, color, and/or design of the filled space defined by the particles may be used to visually show particles that are similar in some way (e.g., size, roundness, sphericity, aspect ratio, etc.) to each other. For example, each particle that has a size within the 20-25 mesh range (707-841 microns) may be filled with a particular color, while particles with sizes within the 25-30 mesh range (595-707 microns) may possess a different fill color. FIGS. 8-1 and 8-2, respectively, depict a before and after example of a collected image showing particles that have been separated and filled by the image processor engine 308. In FIG. 8-2 three different filling options are shown, with the majority of the particles being solid black filled, one particle filled solid white, and another that is filled with a speckled pattern. As discussed above, these differing fills may indicate a difference in size, roundness, sphericity, aspect ratio, or they may indicate particles that are included in the analysis and particles that are excluded.

In one or more embodiments, image processing may also include the characterization of the particles 410. In some embodiments, the characterization may include employing at least one of the two ISO standards for image analysis, ISO 13322-2:2006 and ISO 13322-1:2014, which may be performed by an algorithm programmed into a mobile device. In general, the characterization of the particles may encompass many different calculations including, for example, calculating the average diameter, average aspect ratio, mesh size, roundness and/or sphericity of the particles selected for the analysis during the image processing. In one or more embodiments, these calculations are performed by standardizing a pixel dimension based upon the size tracer on the substrate. For example, a standard pixel dimension may be determined by dividing a known dimension of the length of a line, edge of a geometric object, or a distance between lines and/or geometric objects by the amount of pixels that make up said known dimension. This standard pixel dimension may then be used to determine unknown particle dimensions by counting the pixels that make up a specific dimension (e.g. a diameter of a particle) and multiplying by the standard pixel dimension.

To arrive at some values, including roundness and sphericity, it may be desired to perform the well documented specific mathematical calculations based upon a determined dimension or multiple determined dimensions of a particle to arrive at the value. For example the sphericity of a particle may be calculated as the ratio of the diameter of a sphere of equal volume to the particle to the diameter of a circumscribing sphere of the particle. Additionally, the roundness of a particle may be calculated as the radius of curvature of the most convex part of the particle to the mean radius of the particle. In some embodiments, these values may be output on a per particle basis, while in some embodiments an average of each single particle value may be output.

In some embodiments, upon the characterization of the particles by the image processing engine 308, the results may be output and displayed on the screen 306 of the mobile device 300. In some embodiments, the output may be in the form of a list indicating each parameter and its value. In one or more embodiments, the output may include a graphical representation of the values obtained from the particle characterization. In one or more embodiments, the graphical representation may depict a distribution showing the relative occurrence for each value, or range of values calculated. In some embodiments, the graphical representation may include a chart or graph (e.g., a bar graph, pie chart, etc.). For example, a histogram may be displayed on the screen 306 to show the relative distribution of the diameters of the analyzed particles. The outputs of the list or the graphical representation may help to quickly alert an operator to potential issues at the well site prior to performing any procedures that may result in unintended consequences based upon a lack of appropriate data and well site characterization capabilities The data (e.g. the characterized values) from the analysis may be saved on the mobile device for later use or may be uploaded to a server to form a database with results for a multitude of samples. In some embodiments, the external communication engine 312 of the mobile device 300 may upload at least one of the collected/processed images and/or at least one of the particle analysis data sets to the server augment a database thereon. This database may help to inform about the quality of materials being delivered to a well site or on other issues relating to materials used or produced at the well site. For example, data collected at the well site and stored in a database may be compared to data that is collected at a more sophisticated laboratory to ensure its accuracy and confirm product evaluations. Correspondingly, products may be labeled with a bar code or other labeling and their analyses taken over time may be compared to confirm the constancy of the product so that expected results may be achieved and to alert if there are any issues during its production. Thus, the external communication engine 312 of the mobile device 300 may also serve to retrieve images and/or data sets from the server for viewing on the screen 306 to facilitate comparison at a well site or other remote location.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the disclosure.

EXAMPLE

Example 1

Figures 3, 9:
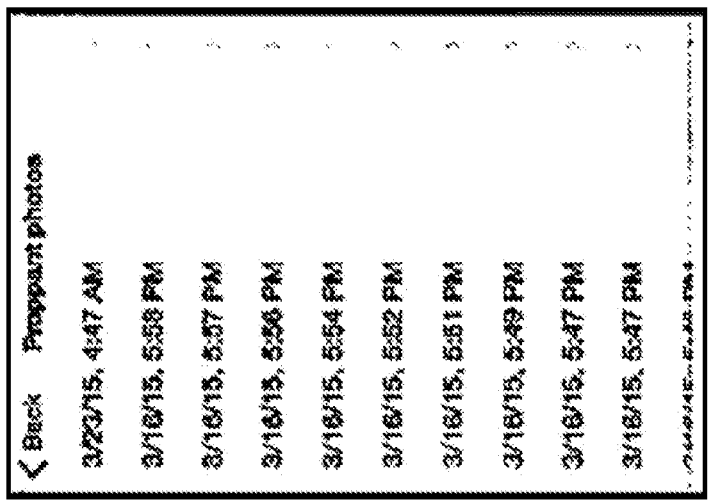
Figures 2, 9:
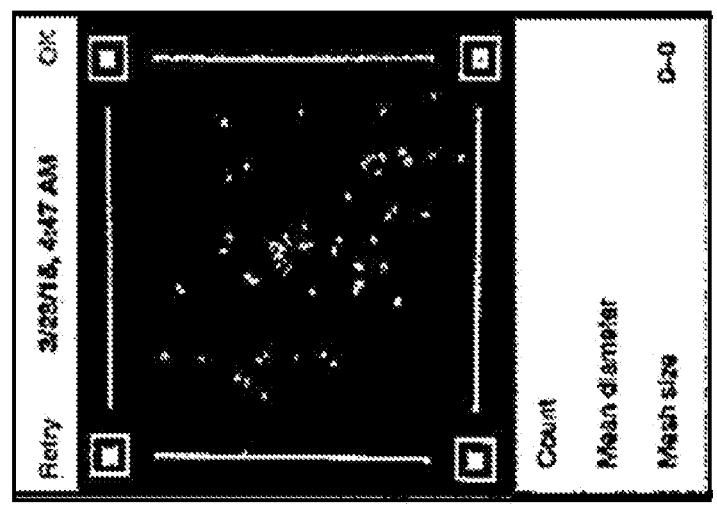
Figures 1, 9:
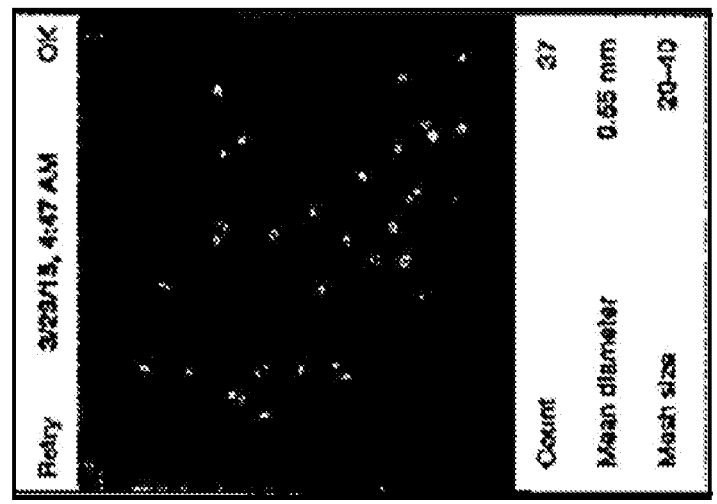

In this example the substrate shown in FIG. 2 was utilized to analyze a sample of proppant materials. Multiple images of the sample of proppant materials were collected by a smartphone camera and stored to the memory of the smartphone. FIG. 9-1 shows the screen of the smartphone showing the saved images as ordered by the date and time of their acquisition. FIG. 9-2 shows the screen of the smartphone upon the selection of the image taken on Mar. 23, 2015 at 4:47 am. The image displayed shows the size tracer from FIG. 2 along with a multitude of lighter contrast spots in the measuring area. The lighter contrast spots are the proppant materials that were placed upon the substrate prior to the collection of the image. The bottom of FIG. 9-2 shows an area where the output of the particle analysis would be displayed to indicate the "Count", "Mean Diameter", and "Mesh size" of the proppant materials. No values are displayed as the image processing has not yet occurred. FIG. 9-3 shows the screen of the smartphone upon completion of the image processing and analysis. The screen shows a more zoomed in measuring area of the substrate to indicate which particles were measured or excluded based upon the filling of the particle areas. The area for the output analysis indicates that 37 particles were analyzed with their average diameter being 0.55 mm and their mesh size being 20-40.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed:

1. A method for analyzing particles, comprising:
    collecting an image of a substrate with a substantially flat surface including a size tracer and a plurality of free particles at rest and arranged as a single monolayer thereon, the substrate having a color that is chosen to increase color contrast between the substrate and the particles;
    wherein processing the collected image includes Marker-Controlled Watershed segmentation of the collected image; and
    outputting a particle analysis of at least a portion of the plurality of particles.

2. The method of claim 1, wherein the size tracer comprises at least one of at least two lines with a known dimension or at least three geometric shapes with at least one known dimension.

3. The method of claim 2, wherein the geometric shapes are selected from circles, ellipses, simple polygons, or star polygons.

4. The method of claim 1, wherein the image is collected and processed by a mobile device.

5. The method of claim 1, wherein the particle size analysis is output by the mobile device.

6. The method of claim 1, wherein the processing further comprises at least one of normalizing the image with respect to the size tracer, filtering, particle edge determination, particle separation, particle image filling, and particle characterization.

7. The method of claim 6, wherein particle characterization comprises calculating at least one parameter of the particles selected from an average or a distribution of their size, aspect ratio, mesh size, roundness and sphericity.

8. The method of claim 1, further comprising:
    repeating the collecting and processing for a plurality of images; and
    outputting a cumulative particle analysis for the plurality of images.

9. The method of claim 1, wherein the particles are selected from fracturing proppants, sands, gravel materials, crushed rock, completion materials, drill cuttings and lost circulation materials.

10. A method for analyzing particles involved in wellbore operations, comprising:
    collecting a plurality of particles to be or that have been used in a wellbore operation;
    collecting an image of a substrate with a substantially flat surface including a size tracer and a plurality of the free particles arranged at rest as a single monolayer thereon, the substrate having a color that is chosen to increase color contrast between the substrate and the particles;
    wherein processing the collected image includes Marker-Controlled Watershed segmentation of the collected image; and
    outputting a particle analysis of at least a portion of the plurality of particles.

11. The method of claim 10, wherein the image of particle for wellbore operations is collected, process and output by the mobile device.

12. The method of claim 10, wherein the particles are selected from fracturing proppants, sands, gravel materials, crushed rock, completion materials, drill cuttings and lost circulation materials.

* * * * *